(12) United States Patent
Hoerold et al.

(10) Patent No.: US 7,087,666 B2
(45) Date of Patent: Aug. 8, 2006

(54) SURFACE-MODIFIED SALTS OF PHOSPHINIC ACID

(75) Inventors: Sebastian Hoerold, Diedorf (DE); Franz-Leo Heinrichs, Gablingen (DE); Elisabeth Jung, Bedburg (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/655,886

(22) Filed: Sep. 5, 2003

(65) Prior Publication Data
US 2004/0049063 A1 Mar. 11, 2004

(30) Foreign Application Priority Data
Sep. 6, 2002 (DE) ............... 102 41 373

(51) Int. Cl.
*C08K 5/34* (2006.01)

(52) U.S. Cl. .................. 524/100; 524/133; 524/135; 252/609

(58) Field of Classification Search ........... 524/100, 524/133, 135; 252/609
See application file for complete search history.

(56) References Cited

U.S. PATENT DOCUMENTS

| | | | |
|---|---|---|---|
| 3,900,444 A | 8/1975 | Racky et al. ........ | 260/45.75 |
| 4,036,811 A | 7/1977 | Noetzel et al. ....... | 260/45.75 |
| 5,326,805 A | 7/1994 | Sicken et al. ........ | 524/101 |
| 5,879,920 A | 3/1999 | Dale et al. | |
| 5,958,287 A | 9/1999 | Pullen et al. | |
| 6,084,012 A | 7/2000 | Gareiss et al. | |
| 6,124,366 A | 9/2000 | Pullen et al. | |
| 6,207,736 B1 | 3/2001 | Nass et al. ........... | 524/126 |
| 6,365,071 B1 | 4/2002 | Jenewein et al. | |
| 6,509,401 B1 | 1/2003 | Jenewein et al. ...... | 524/116 |
| 6,716,899 B1 | 4/2004 | Klatt et al. | |
| 2004/0176510 A1 | 9/2004 | Geprega | |

FOREIGN PATENT DOCUMENTS

| | | |
|---|---|---|
| DE | 2 252 258 | 5/1974 |
| DE | 24 47 727 | 4/1976 |
| DE | 3531500 | 5/1986 |
| DE | 42 18 184 | 12/1993 |
| DE | 197 34 437 | 2/1999 |
| DE | 197 37 727 | 7/1999 |
| DE | 199 20 276 | 11/2000 |
| EP | 0 298 375 | 1/1989 |
| EP | 0 576 833 | 1/1994 |
| EP | 0 584 567 | 3/1994 |
| EP | 0 699 708 | 3/1996 |
| WO | WO 97/39053 | * 10/1997 |

OTHER PUBLICATIONS

USPTO Office Action for U.S. Appl. No. 10/656,313, mailed Jan. 25, 2005.
German Office Action for DE 10241373.8, mailed Nov. 9, 2003.
U.S. Appl. No. 11/205,832, by Thewes, et al., filed Aug. 17, 2005.

* cited by examiner

*Primary Examiner*—Johann Richter
*Assistant Examiner*—Chukwuma Nwaonicha
(74) *Attorney, Agent, or Firm*—Anthony A. Bisulca

(57) ABSTRACT

The invention relates to surface-modified phosphinic salts of the formula (I) and/or diphosphinic salts of the formula (II) and/or polymers of these,

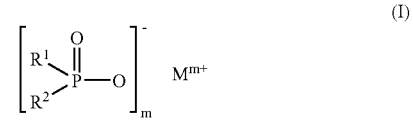

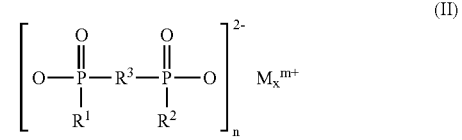

where
$R^1$ and $R^2$ are identical or different and are $C_1$–$C_6$-alkyl, linear or branched, and/or aryl;
$R^3$ is $C_1$–$C_{10}$-alkylene, linear or branched, $C_6$–$C_{10}$-arylene, -alkylarylene, or -arylalkylene;
M is Mg, Ca, Al, Sb, Sn, Ge, Ti, Zn, Fe, Zr, Ce, Bi, Sr, Mn, Li, Na, K, and/or a protonated nitrogen base;
m is from 1 to 4;
n is from 1 to 4;
x is from 1 to 4,
wherein the phosphinic salts and/or diphosphinic salts, or their polymers, have been encapsulated with a surface layer composed of a synthetic resin or a wax, and to a process for their preparation, and to their use as flame retardants for thermoplastic and thermoset polymers.

33 Claims, No Drawings

SURFACE-MODIFIED SALTS OF PHOSPHINIC ACID

The invention relates to surface-modified phosphinic salts, to a process for their preparation, and to their use as flame retardants for thermoplastic and thermoset polymers.

Salts of phosphinic acids (phosphinates) have proven to be effective flame-retardant additives for thermoplastic polymers, and this applies not only to the alkali metal salts (DE-A-2 252 258) but also the salts of other metals (DE-A-2 447 727).

Calcium phosphinates and aluminum phosphinates have been described as particularly effective in polyesters, and, compared with the alkali metal salts (EP-A-0 699 708), give less impairment of the properties of the polymer molding compositions.

Synergistic combinations of the phosphinates mentioned with certain nitrogen-containing compounds have also been found, and in very many polymers these are more effective as flame retardants than the phosphinates alone (PCT/EP97/01664 and DE-A-197 34 437 and DE-A-197 37 727).

The addition of organophosphorus flame retardants can cause undesired adverse effects on the polymer. For example, in thermoplastic polyesters the results can be degradation of the polymer chains via acid-catalyzed ester cleavage. DE 199 20 276 describes the use of carbodiimides in association with organophosphorus flame retardants. A disadvantage is the high price of carbodiimide stabilizers. Discoloration of the polymers can also occur, in particular at very high processing temperatures, e.g. those reached in the case of reinforced nylon-6,6.

Surprisingly, it has now been found that the processing of the various phosphinates in thermoplastic polymers can be markedly improved via surface-modification of the phosphinates. Suitable surface-modification increases, from about 340 to above 380° C., the thermal stability temperature of the phosphinates. This permits a considerable reduction in polymer degradation on incorporation into thermoplastic polyesters, such as polybutylene terephthalate (PBT). In addition, the discoloration resulting from high processing temperatures is suppressed on incorporation into thermoplastic polymers such as nylon-6,6.

Surprisingly, it has also been found that the flame-retardant action of the phosphinates is not impaired by the surface-modification, despite the use of organic, i.e. combustible, materials for the surface-modification.

The invention therefore provides surface-modified phosphinic salts of the formula (I) and/or diphosphinic salts of the formula (11) and/or polymers of these,

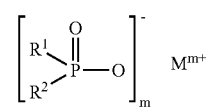

(I)

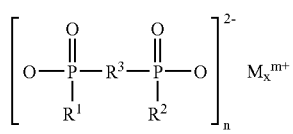

(II)

where
$R^1$ and $R^2$ are identical or different and are $C_1$–$C_6$-alkyl, linear or branched, and/or aryl;

$R^3$ is $C_1$–$C_{10}$-alkylene, linear or branched, $C_6$–$C_{10}$-arylene, -alkylarylene, or -arylalkylene;

M is Mg, Ca, Al, Sb, Sn, Ge, Ti, Zn, Fe, Zr, Ce, Bi, Sr, Mn, Li, Na, K, and/or a protonated nitrogen base;

m is from 1 to 4;
n is from 1 to 4;
x is from 1 to 4, wherein the phosphinic salts and/or diphosphinic salts, or their polymers, have been encapsulated with a surface layer composed of a synthetic resin or a wax.

The surface-modified phosphinic salts of the formula (I) and/or diphosphinic salts of the formula (II), and/or their polymers, are hereinafter also termed "compounds".

$R^1$ and $R^2$, identical or different, are preferably $C_1$–$C_6$-alkyl, linear or branched, and/or phenyl.

$R^1$ and $R^2$, identical or different, are particularly preferably methyl, ethyl, n-propyl, isopropyl, n-butyl, tert-butyl, n-pentyl, and/or phenyl.

A preferred meaning of $R^3$ is methylene, ethylene, n-propylene, isopropylene, n-butylene, tert-butylene, n-pentylene, n-octylene or n-dodecylene.

Another preferred meaning of $R^3$ is phenylene or naphthylene.

Another preferred meaning of $R^3$ is methylphenylene, ethylphenylene, tert-butylphenylene, methylnaphthylene, ethylnaphthylene or tert-butylnaphthylene.

Another preferred meaning of $R^3$ is phenylmethylene, phenylethylene, phenylpropylene, or phenylbutylene.

M is preferably calcium, aluminum, or zinc.

The synthetic resin preferably comprises a curable resin.

The curable resin preferably comprises an epoxy resin, a phenolic resin, or a melamine resin.

The amounts preferably added of the synthetic resin are from 0.1 to 20% by weight, based on the phosphinic salt.

The amounts particularly preferably added of the synthetic resin are from 0.5 to 10% by weight, in particular from 1 to 5% by weight, based on the phosphinic salt.

The waxes preferably comprise hydrocarbon waxes, ester waxes, oxidized polyolefin waxes, oxidized hydrocarbon waxes, amide waxes, wax acids, wax soaps, and/or a combination of these components.

The waxes are preferably used in the form of powder, micropowder, dispersion in water, dispersion in solvent, or in the form of dispersions in water/solvent mixtures.

Preferred amounts added of the waxes are from 0.5 to 10% by weight, with preference from 1 to 5% by weight, based on the phosphinic salt.

It is preferable to add an amount of from 0.1 to 5% by weight, preferably from 0.1 to 1% by weight, based on the phosphinic salt, of a water-emulsifiable organic liquid, acting as phlegmatizer.

The water-emulsifiable organic liquid preferably comprises polyglycols, phthalates, or aromatic phosphoric esters.

Melamine phosphate, dimelamine phosphate, melamine pyrophosphate, melamine polyphosphates, melam polyphosphates, melem polyphosphates and/or melon polyphosphates are preferably also present in the compounds.

Melamine condensation products, such as melam, melem, and/or melon are preferably also present in the compounds.

Oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, dicyandiamide, and/or guanidine are preferably also present in the compounds.

Nitrogen-containing phosphates of the formulae $(NH_4)_y$ $H_{3-y}PO_4$ and, respectively, $(NH_4PO_3)_z$, are preferably present in the compounds, where y is from 1 to 3 and z is from 1 to 10 000.

A synthetic inorganic compound and/or a mineral product are preferably present in the compounds.

The synthetic inorganic compound and/or the mineral product m preferably comprises an oxygen compound of silicon, magnesium compounds, metal carbonates of metals of the second main group of the periodic table, red phosphorus, or comprises zinc compounds or aluminum compounds.

Preferred compounds are those wherein the oxygen compounds of silicon comprise salts and esters of orthosilicic acid and condensation products thereof, or comprise silicates, zeolites, and silicas, or comprise glass powder, glass/ceramic powder, or ceramic powder; the magnesium compounds comprise magnesium hydroxide, hydrotalcites, magnesium carbonates or magnesium calcium carbonates; the zinc compounds comprise zinc oxide, zinc stannate, zinc hydroxystannate, zinc phosphate, zinc borate, or zinc sulfides; the aluminum compounds comprise aluminum hydroxide or aluminum phosphate.

Nitrogen compounds are preferably present as a further component.

The nitrogen compounds are preferably those of the formulae (III) to (VIII) or mixtures thereof

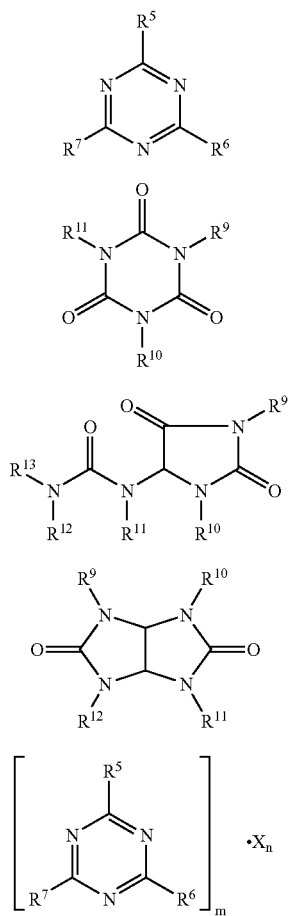

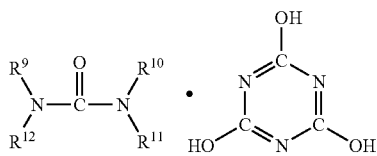

where
$R^5$ to $R^7$ are hydrogen, $C_1$–$C_8$-alkyl, or $C_5$–$C_{16}$-cycloalkyl or -alkylcycloalkyl, unsubstituted or substituted with a hydroxy function or with a $C_1$–$C_4$-hydroxyalkyl function, or are $C_2$–$C_8$-alkenyl, $C_1$–$C_8$-alkoxy, -acyl, or -acyloxy, or $C_6$–$C_{12}$-aryl or -arylalkyl, or —$OR^8$ or —$N(R^8)R^9$, or else N-alicyclic systems or N-aromatic systems, $R^8$ is hydrogen, $C_1$–$C_8$-alkyl, $C_5$–$C_{16}$-cycloalkyl or -alkylcycloalkyl, unsubstituted or substituted with a hydroxy function or with a $C_1$–$C_4$-hydroxyalkyl function, or is $C_2$–$C_8$-alkenyl, $C_1$–$C_8$-alkoxy, -acyl, or -acyloxy, or $C_6$–$C_{12}$-aryl or -arylalkyl, $R^9$ to $R^{13}$ are the groups of $R^8$, or else —O—$R^8$, m and n, independently of one another, are 1, 2, 3, or 4, X is acids which can form adducts with triazine compounds (III).

Carbodiimides are also preferably present.

The invention also provides a process for preparing surface-modified phosphinic salts, which comprises adjusting the pH of an aqueous suspension of a phosphinate to 4–9, then adding an aqueous emulsion of a wax or of a synthetic resin, or a solution of the wax or synthetic resin in a water-miscible solvent, stirring for from 0.5 to 3 hours at a temperature of from 40 to 80° C., and then, where appropriate, adding an aqueous emulsion of an organic liquid, and stirring for from 0.5 to 3 hours at a temperature of from 20 to 90° C., in such a way that from 0.1–20% of wax and, respectively, synthetic resin and, where appropriate, from 0.1 to 5% of phlegmatizer are applied to 80–99.9 parts by weight of phosphinate.

The invention also provides a flame-retardant plastics molding composition comprising the surface-modified phosphinic salts of the invention.

The thermoplastic polymers of the flame-retardant plastics molding composition preferably comprise HI (high-impact) polystyrene, polyphenylene ethers, polyamides, polyesters, polycarbonates, or blends or polyblends of the type represented by ABS (acrylonitrile-butadiene-styrene), or PC/ABS (polycarbonate/acrylonitrile-butadiene).

The polymer preferably comprises polyamide and/or polyester.

The flame-retardant plastics molding composition uses, independently of one another, the surface-modified phosphinic salt at a concentration of from 1 to 30% by weight, and the nitrogen compound at a concentration of from 0.1 to 10% by weight, based in each case on the plastics molding composition.

Finally, the invention also provides thermoplastic polymer moldings, thermoplastic polymer films, thermoplastic polymer filaments, or thermoplastic polymer fibers, comprising the surface-modified phosphinic salts of the invention.

The thermoplastic polymers of the polymer moldings, of the polymer films, of the polymer filaments, or of the polymer fibers preferably comprise HI (high-impact) polystyrene, polyphenylene ethers, polyamides, polyesters, polycarbonates, or blends or polyblends of the type represented by ABS (acrylonitrile-butadiene-styrene), or PC/ABS (polycarbonate/acrylonitrile-butadiene-styrene), polyamide, polyester, and/or ABS.

The polymer moldings, polymer films, polymer filaments, or polymer fibers preferably comprise
from 1 to 30% by weight of the surface-modified phosphinic salts
from 1 to 99% by weight of thermoplastic polymer, or a mixture of these
from 0 to 5% by weight of additives
from 0 to 50% by weight of filler.

The polymer moldings, polymer films, polymer filaments, or polymer fibers, particularly preferably comprise
from 5 to 20% by weight of the surface-modified phosphinic salts
from 48 to 95% by weight of polymer, or a mixture of these
from 0 to 2% by weight of additives
from 0 to 30% by weight of filler.

The surface modification preferably comprises a coating of the phosphinates by waxes or by synthetic resins. Particular preference is given to thermoset synthetic resins, such as cured epoxy resins or melamine resins.

Waxes are naturally occurring or synthesized substances which at 20° C. are solid and kneadable, and above 40° C. undergo melting without decomposition and have low viscosity. The temperature at which waxes generally convert into the molten, low-viscosity state is from 50 to 90° C., or in exceptional cases up to about 200° C. A distinction is made between naturally occurring waxes, such as carnauba wax, chemically modified waxes, such as montan ester waxes, and synthetic waxes, such as polyethylene waxes. Preference is given to hydrocarbon waxes, ester waxes, oxidized polyolefins, oxidized hydrocarbon waxes, amide waxes, wax acids, wax soaps, or a combination of these components.

In the preparation of the phosphinic salts of the invention, the waxes may be used in the form of powder, micropowder, dispersion in water, dispersion in solvent, or in the form of dispersions in water/solvent mixtures.

Synthetic resins according to DIN 55958 are synthetic resins which are prepared by a polymerization, polyaddition, or polycondensation reaction. Thermosets is a collective term for any of the plastics prepared from curable resins. Among the thermosets are epoxy resins, polyurethanes, phenolic resins, melamine resins, and also unsaturated polyester resins.

Epoxy resins are compounds prepared via a polyaddition reaction of an epoxy resin component and a crosslinking (hardener) component. The epoxy resin component used comprises aromatic polyglycidyl esters, such as bisphenol A diglycidyl esters, bisphenol F diglycidyl esters, polyglycidyl esters of phenol-formaldehyde resins or of cresol-formaldehyde resins, polyglycidyl esters of phthalic, isophthalic or terephthalic acid, or else of trimellitic acid, N-glycidyl compounds of aromatic amines or of heterocyclic nitrogen bases, and also di- and polyglycidyl compounds of polyhydric aliphatic alcohols. Hardeners used comprise polyamines, such as triethylenetetramine, aminoethylpiperazine, and isophoronediamine, polyamidoamines, polybasic acids or anhydrides of these, e.g. phthalic anhydride, hexahydrophthalic anhydride, methyltetrahydrophthalic anhydride, or phenols. The crosslinking may also take place via polymerization, using suitable catalysts.

Melamine resins or melamine-formaldehyde resins are curable condensation products of melamine and formaldehyde. The curing takes place at relatively high temperatures (>100° C.), mostly in the presence of acidic accelerators. A thermoset is formed, with elimination of water.

The flame-retardant action of the surface-modified phosphinates may be improved via combination with other flame retardants, preferably with nitrogen-containing synergists, or with phosphorus/nitrogen flame retardants, as described above.

The surface-modified phosphinate of the invention is preferably used in combination with nitrogen compounds as flame retardant.

The invention also provides the use of the surface-modified phosphinates of the invention to render thermoplastic polymers flame-retardant. Thermoplastic polymers, as stated by Hans Domininghaus in "Die Kunststoffe und ihre Eigenschaften" [Plastics and their properties], 5th edition (1998), pp. 14–25, are polymers whose molecular chains either have no side branches or have side branches of varying length and number, and which soften when exposed to heat, and can be molded in almost any desired fashion.

The surface-modified phosphinates of the invention are preferably used at a concentration of from 1 to 30% by weight, and the nitrogen component at a concentration of 0.1 to 10% by weight, in each case based on the plastics molding composition.

The term "phosphinic salt" hereinafter encompasses salts of phosphinic or diphosphinic acid, and their polymers.

When the phosphinic salts are prepared in an aqueous medium, they are substantially monomeric compounds. Depending on the reaction conditions, polymeric phosphinic salts can also sometimes be produced.

Examples of phosphinic acids which are a suitable constituent of the phosphinic salts are: dimethylphosphinic acid, ethylmethylphosphinic acid, diethylphosphinic acid, methyl-n-propylphosphinic acid, methanedi(methylphosphinic acid), benzene-1,4-di(methylphosphinic acid), methylphenylphosphinic acid, diphenylphosphinic acid.

The salts of phosphinic acids of the invention may be prepared by known methods, for example those described in more detail in EP 0699 708 A2. An example of a method for this reacts the phosphinic acids in aqueous solution with metal carbonates, metal hydroxides, or metal oxides.

Organic polymers, such as waxes or synthetic resins, may be used for the inventive surface-modification of the phosphinic salts. The proportion of wax or polymer applied to the surface of the phosphinates is from 0.1 to 20% by weight, preferably from 0.5 to 10% by weight, and particularly preferably from 1 to 5% by weight. A preferred application method is deposition from aqueous dispersion.

The amount of the phosphinic salts to be added to the polymers may vary within wide limits. The amount generally used is from 1 to 30% by weight, based on the plastics molding composition. The ideal amount depends on the nature of the polymer and of the type of actual phosphinic salt used. Preferred amounts are from 3 to 25% by weight, in particular from 5 to 20% by weight, based on the plastics molding composition.

Depending on the nature of the polymer used, and on the properties desired, the abovementioned phosphinic salts may be utilized in various physical forms for the inventive flame retardant combination. For example, the phosphinic salts may be milled to give a fine-particle form in order to achieve better dispersion in the polymer. It is also possible, if desired, to use a mixture of various phosphinic salts.

The phosphinic salts of the invention are thermally stable, and do not either decompose the polymers during processing or affect the process of preparation of the plastics molding composition. Under the usual conditions for preparation and processing of thermoplastic polymers, the phosphinic salts are not volatile.

The amount of the nitrogen compound to be added to the polymers may vary within wide limits. The amount generally used is from 1 to 30% by weight, based on the plastics molding composition. The ideal amount depends on the nature of the polymer, on the nature of the phosphinic salt used, and also on the type of actual nitrogen compound. Preferred amounts are from 3 to 20% by weight, in particular from 5 to 15% by weight.

The flame-retardant components may be incorporated into thermoplastic polymers, for example by premixing all of the constituents in the form of powder and/or granules in a mixer, and then homogenizing them within the polymer melt in a compounding assembly (e.g. a twin-screw extruder). The melt is usually drawn off in the form of a strand, cooled, and pelletized. The components may also be introduced separately by way of a feed system, directly into the compounding assembly.

It is also possible for the flame-retardant additives to be admixed with ready-to-use polymer pellets or ready-to-use polymer powder, and for the mixture to be processed directly on an injection molding machine, to give moldings.

Besides the flame-retardant combination of the invention, fillers and reinforcing materials may also be added to the molding compositions, examples being glass fibers, glass beads, or minerals, such as chalk. Other additives, such as antioxidants, light stabilizers, lubricants, colorants, nucleating agents, or antistats, may also be present in the molding compositions. Examples of the additives which may be used are given in EP-A-584 567. The flame-retardant plastics molding compositions are suitable for producing moldings, films, filaments, or fibers, e.g. by injection molding, extrusion, or compression molding.

EXAMPLES

1. Components Used

Commercially available polymers (pellets):

| Nylon-6,6 (GR PA 66): | ® Durethan AKV 30 (Bayer AG, D) comprising 30% of glass fibers. |
|---|---|
| Polybutylene terephthalate (GR PBT): | ® Celanex 2300 GV1/30 (Ticona GmbH, D), comprising 30% of glass fibers. |

Phosphinates:

Aluminum salt of diethylphosphinic acid, hereinafter termed DEPAL.

Aluminum salt of methylethylphosphinic acid, hereinafter termed MEPAL.

Surface Modifier:

Epoxy Resin:

Beckopox EP 140, bisphenol A bisglycidyl ether, EP value 0.54 mol/100 g,

EH 623w polyamine hardener, water-dilutable amine hardener, Vianova Resins GmbH, Mainz Melamine Resin:

Madurit MW 909, partially etherified melamine-formaldehyde resin, water-soluble powder, Vianova Resins GmbH, Mainz, D Waxes:

Agrocer 09: aqueous wax dispersion based on montan wax, comprising 23% of wax

Ceridust 5551, partially saponified ester wax of a montanic acid, micronized, particle size 9 μm, Clariant GmbH, Sulzbach, D Nitrogen Synergists:

Melapur® MP (melamine phosphate), DSM Melapur, NL

Melapur200 (melamine polyphosphate), DSM Melapur, NL

2. Surface Modification 2.1 Encapsulation by an Epoxy Resin

Example 1

200 g of MEPAL are dispersed in 200 g of deionized water. 5 g of Beckopox 122w and 5 g of Beckopox EH 623w are emulsified in 40 ml of $H_2O$, with stirring.

The resultant emulsions are stirred into the dispersed MEPAL. This mixture is stirred for 1 hour at 60° C., and the solid is filtered off, using a filter paper ("Weissband"). The filter cake is washed with sufficient water. The material is dried at 120° C. in a vacuum drying cabinet. 203.7 g of product are obtained.

Example 2

200 g of DEPAL are dispersed in 200 g of deionized water. 5 g of Beckopox 122w and 5 g of Beckopox EH 623w are emulsified in 40 ml of $H_2O$, with stirring.

The resultant emulsions are stirred into the dispersed DEPAL. This mixture is stirred for 1 hour at 60° C., and the solid is filtered off, using a filter paper ("Weissband"). The filter cake is washed with sufficient water. The material is dried at 120° C. in a vacuum drying cabinet. 203.7 g of product are obtained.

2.2 Encapsulation by a Melamine Reisin

Example 3

200 g of MEPAL are dispersed in 200 g of deionized water. 10 g of MADURIT MW 909 are emulsified in 25 g of water at 70° C. The emulsion is stirred into the dispersed MEPAL. The pH value of the mixture is adjusted to 4.5, using 10% strength $H_2SO_4$. This mixture is stirred at 60° C. for 1 hour. A further 10 g of MADURIT MW 909 are then emulsified in 25 g of water at 70° C., and stirred into the MEPAL, and again stirred at 60° C. for 1 hour.

The solids are filtered off from this mixture, using a filter paper ("Weissband"). The filter cake is washed with sufficient water. The material is dried at 120° C. in a vacuum drying cabinet. 205.3 g of product are obtained.

2.3 Encapsulation by a Modified Wax

Example 4

Using Aqueous Wax Emulsion 200 g of MEPAL are dispersed in 250 g of deionized water. 40 g of Agrocer 09 are stirred into the dispersed MEPAL. This mixure is stirred at room temperature for 1 hour, and the solids are then filtered off, using a filter paper ("Weissband"). The filter cake is washed with sufficient water. The material is dried at 120° C. in a vacuum drying cabinet. 208.4 g of product are obtained.

Example 5

Using Micronized Wax 200 g of MEPAL are dispersed in 250 g of deionized water. 20 g of Ceridust 5551 are stirred into the dispersed MEPAL. This mixure is stirred at room temperature for 1 hour, and the solids are then filtered off, using a filter paper ("Weissband"). The filter cake is washed with sufficient water. The material is dried at 120° C. in a vacuum drying cabinet. 210.7 g of product are obtained.

3. Preparation, Processing, and Testing of Flame-retardant Plastics Molding Compositions The flame-retardant components were mixed, in the ratio stated in the tables, with the polymer granules and, where appropriate, with additives, and incorporated in a twin-screw extruder (Leistritz LSM 30/34) at temperatures of from 230 to 260° C. (GR PBT) and, respectively, from 260 to 280° C. (GR PA 66). The homogenized polymer strand was drawn off, cooled in the waterbath, and then granulated.

After adequate drying, the molding compositions were processed on an injection molding machine (Aarburg Allrounder) at melt temperatures of from 240 to 270° C. (GR PBT) and, respectively, from 260 to 290° C. (GR PA 66) to give test specimens, and tested and classified for flame retardancy, using the UL 94 test (Underwriters Laboratories).

The oil number gives the amount in g of oil needed to process 100 g of solid (e.g. pigment) to give a coherent, putty-like composition (DIN ISO 787 T5(February 1983)).

Thermal stability was measured in air, using a heating rate of 5° C./min, by differential thermal analysis (DTA), using a Netzsch STA 409C.

Table 1 shows the thermal stability of pure MEPAL, and the increase in thermal stability resulting from the surface-modification of the invention. The extrapolated temperature of the start of decomposition is given. The effect of the surface-modification is also shown by the oil number measurement. A reduction in oil number means better wetting of the powder with oil, and therefore higher compatibility with polymer.

TABLE 1

Thermal stability and oil number of surface-modified MEPAL

| Phosphinate | Surface-modification | Oil number ml of oil/100 g | Thermal stability DTA (5° C./min) |
|---|---|---|---|
| MEPAL | none | 50 | 339° C. |
| MEPAL | 1% epoxy resin | 49 | 372° C. |
| MEPAL | 2% epoxy resin | 46 | 376° C. |
| MEPAL | 5% epoxy resin | 43 | 397° C. |
| MEPAL | 5% Ceridust 5551 | 40 | 391° C. |
| MEPAL | 5% Agrocer 09 | 39 | 391° C. |
| MEPAL | 8% melamine resin | 42 | 380° C. |

Table 2 shows tests in PBT. The SV value determined is the viscosity of a 1% strength solution in dichloroacetic acid.

TABLE 2

Incorporation of surface-modified DEPAL in GR PBT

| FR | | DEPAL | DEPAL | DEPAL | DEPAL | none |
|---|---|---|---|---|---|---|
| Modification | | none | 5% of wax* | 8% of MF resin** | 5% of EP resin*** | |
| Amount added | % | 20 | 20 | 20 | 20 | 0 |
| UL 94 1.6 mm afterflame times | s | V-1 47 | V-1 81 | V-0 19 | V-0 15 | n.c. destroyed by fire test |
| UL 94 0.8 mm afterflame times | s | V-1 53 | V-1 67 | V-1 66 | V-1 57 | n.c. destroyed by fire test |
| SV value | | 644 | 740 | 695 | 782 | 1000 |

*Agrocer 09
**Madurit MW 909
***Beckopox EP 140/EH 623w

Using 20% of DEPAL, V-0 classification is achieved in glass-fiber-reinforced PVT. When DEPAL is incorporated into PBT partial degradation of the polymer occurs, and this is seen in the reduction of the SV value. The result is a considerable worsening of significant mechanical properties, such as ultimate tensile strength and tensile strain at break. The polymer degradation in PBT is restricted by the inventive surface-modification.

Table 3 shows tests in PA 66.

TABLE 3

Incorporation of surface-modified DEPAL with synergist melamine polyphosphate (MPP) in GR PA 66

| FR | | DEPAL/MPP | DEPAL/MPP | DEPAL/MPP | DEPAL/MPP | none |
|---|---|---|---|---|---|---|
| Modification | | none | 5% of wax* | 8% of MF resin** | 5% of EP resin*** | |
| Amount added | % | 10 + 5 | 10 + 5 | 10 + 5 | 10 + 5 | 0 |

TABLE 3-continued

Incorporation of surface-modified DEPAL with synergist melamine polyphosphate (MPP) in GR PA 66

| FR | | DEPAL/MPP | DEPAL/MPP | DEPAL/MPP | DEPAL/MPP | none |
|---|---|---|---|---|---|---|
| UL 94 1.6 mm afterflame times | s | V-0 20 | V-0 21 | V-0 19 | V-0 15 | n.c. destroyed by fire test |
| UL 94 0.8 mm afterflame times | s | V-1 51 | V-1 67 | V-1 66 | V-1 57 | n.c. destroyed by fire test |
| Color of UL specimens | | grayish brown | yellowish | brown | yellowish | yellowish |

*Agrocer 09
**Madurit MW 909
***Beckopox EP 140/EH 623w

Using 10% of DEPAL and 5% of melamine polyphosphate, V-0 classification is achieved in GR PA 66. However, the processing temperature of >300° C. results in the finding of a marked disoloration of the test specimens toward graying brown. The discoloration can be reduced via surface-modification, using epoxy resin or wax.

The invention claimed is:

1. A composition comprising a surface-modified phosphinic salt selected from the group consisting of formula (I), a surface-modified diphosphinic salt of the formula (II), mixtures of formula (I) and formula (II), polymers of formula (I), polymers of formula (II), mixtures of polymers of formula (I) and (II), and mixtures thereof,

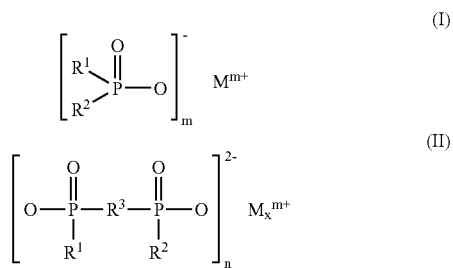

where
R¹ and R² are identical or different and are $C_1$–$C_6$-alkyl, linear or branched, or aryl;
R³ is $C_1$–$C_{10}$-alkylene, linear or branched, $C_8$–$C_{10}$-arylene, -alkylarylene, or -arylalkylene;
M is Mg, Ca, Al, Sb, Sn, Ge, Ti, Zn, Fe, Zr, Ce, Bi, Sr, Mn, Li, Na, K, or a protonated nitrogen base;
m is from 1 to 4;
n is from 1 to 4;
x is from 1 to 4,
wherein the phosphinic salt and/or diphosphinic salt, or their polymers, have been encapsulated with a surface layer composed of a synthetic resin or a wax.

2. The composition as claimed in claim 1, wherein R¹ and R² are identical or different and are $C_1$–$C_6$-alkyl, linear or branched, and phenyl.

3. The composition as claimed in claim 1, wherein R¹ and R² are identical or different and are methyl, ethyl, n-propyl, isopropyl, n-butyl, tert-butyl, n-pentyl and phenyl.

4. The composition as claimed in claim 1, wherein R³ is methylene, ethylene, n-propylene, isopropylene, n-butylene, tert-butylene, n-pentylene, n-octylene or n-dodecylene.

5. The composition as claimed in claim 1, wherein R³ is phenylene or naphthylene.

6. The composition as claimed in claim 1, wherein R³ is methylphenylene, ethylphenylene, tert-butylphenylene, methylnaphthylene, ethylnaphthylene, or tert-butylnaphthylene.

7. The composition as claimed in claim 1, wherein R³ is phenylmethylene, phenylethylene, phenylpropylene, or phenylbutylene.

8. The composition as claimed in claim 1, wherein M is calcium, aluminum, or zinc.

9. The composition as claimed in claim 1, wherein the synthetic resin comprises a curable resin.

10. The composition as claimed in claim 9, wherein the curable resin is an epoxy resin, a phenolic resin, or a melamine resin.

11. The composition as claimed in claim 9, wherein the amount of the synthetic resin is from 0.1 to 20% by weight, based on the phosphinic salt.

12. The composition as claimed in claim 9, wherein the amount of the synthetic resin is from 0.5 to 10% by weight, based on the phosphinic salt.

13. The composition as claimed in claim 1, wherein the wax is selected from the group consisting of hydrocarbon waxes, ester waxes, oxidized polyolefin waxes, oxidized hydrocarbon waxes, amide waxes, wax acids, wax soaps and a combination of these components.

14. The composition as claimed in claim 1, wherein the wax is used in a form selected from the group consisting of powder, micropowder, dispersion in water, dispersion in solvent, and in the form of dispersions in water/solvent mixtures.

15. The composition as claimed in claim 1, wherein the amount added of the wax is from 0.5 to 10% by weight, based on the phosphinic salt.

16. The composition as claimed in claim 1, wherein a water-emulsifiable organic liquid acting as phlegmatizer is added in an amount of from 0.1 to 5% by weight, based on the phosphinic salt.

17. The composition as claimed in claim 16, wherein the water-emulsifiable organic liquid is selected from the group consisting of polyglycols, phthalates, and aromatic phosphoric esters.

18. The composition as claimed in claim 1, further comprising at least one of the compound selected from the group consisting of melamine phosphate, dimelamine phosphate, melamine pyrophosphate, melamine polyphosphates, melam polyphosphates, melem polyphosphates and melon polyphosphates.

19. The composition as claimed in claim 1, further comprising at least one melamine condensation product selected from the group consisting of melam, melem, and melon.

20. The composition as claimed in claim 1, further comprising at least one of compound selected from the group consisting of oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, dicyandiamide.

21. The composition as claimed in claim 1, further comprising a nitrogen-containing phosphates of the formulae $(NH_4)_yH_{3-y}PO_4$ or $(NH_4PO_3)_z$ where y is from 1 to 3 and z is from 1 to 10 000.

22. The composition as claimed in claim 1, further comprising a synthetic inorganic compound a mineral product or both.

23. The composition as claimed claim 22, wherein the synthetic inorganic compound or the mineral product is selected from the group consisting of an oxygen compound of silicon, magnesium compounds, metal carbonates of metals of the second main group of the periodic table, red phosphorus, comprises zinc compounds or aluminum compounds.

24. The composition as claimed in claim 23, wherein the oxygen compounds of silicon are selected from the group consisting of salts and esters of orthosilicic acid and condensation products thereof, silicates, zeolites, silicas, glass powder, glass/ceramic powder, ceramic powder; wherein the magnesium compounds are selected from the group consisting of magnesium hydroxide, hydrofalcites, magnesium carbonates and magnesium calcium carbonates; wherein the zinc compounds are selected from the group consisting of zinc oxide, zinc stannate, zinc hydroxystannate, zinc phosphate, zinc borate, and zinc sulfides; and wherein the aluminum compounds are selected from the group consisting of aluminum hydroxide and aluminum phosphate.

25. The composition as claimed in claim 1, further comprising at least one nitrogen compound.

26. The composition as claimed in claim 25, wherein the nitrogen compounds are selected from the formulae (III) to (VIII) and mixtures thereof

(III)

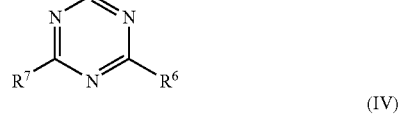
(IV)

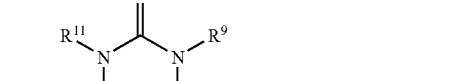
(V)

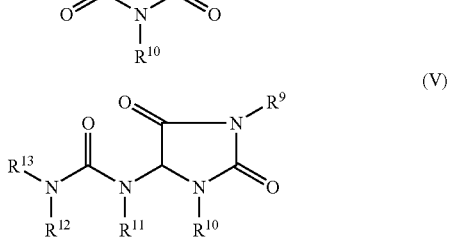

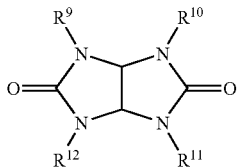
(VI)

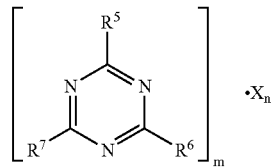
(VII)

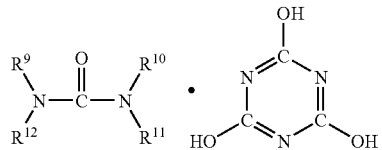
(VIII)

where
R$^5$ to R$^7$ are hydrogen, $C_1$–$C_8$-alkyl, or $C_5$–$C_{16}$-cycloalkyl or -alkylcycloalkyl, unsubstituted or substituted with a hydroxy function or with a $C_1$–$C_4$-hydroxyalkyl function, $C_2$–$C_8$-alkenyl, $C_1$–$C_8$-alkoxy, -acyl, or -acyloxy, $C_6$–$C_{12}$-aryl or -arylalkyl, —OR$^8$, —N(R$^8$)R$^9$, N-alicyclic systems or N-aromatic systems, R$^8$ is hydrogen, $C_1$–$C_8$-alkyl, $C_5$–$C_{16}$-cycloalkyl or -alkylcycloalkyl, unsubstituted or substituted with a hydroxy function or with a $C_1$–$C_4$-hydroxyalkyl function, $C_2$–$C_8$-alkenyl, $C_1$–$C_8$-alkoxy, -acyl, or -acyloxy, or $C_6$–$C_{12}$-aryl or -arylalkyl, R$^9$ to R$^{13}$ are the groups of R$^8$, or —O—R$^8$, m and n, independently of one another, are 1, 2, 3, or 4, X is an acid which can form adducts with triazine compounds (III).

27. The composition as claimed in claim 1, further comprising at least one carbodiimide.

28. A process for preparing compositions as claimed in claim 1 comprising the steps of adjusting the pH of an aqueous suspension of a phosphinate to between 4 and 9, then adding an aqueous emulsion of a wax or of a synthetic resin, or a solution of the wax or synthetic resin in a water-miscible solvent, stirring for from 0.5 to 3 hours at a temperature of from 40 to 80° C., wherein 0.1% to 20% wax or synthetic resin applied to 80 to 99.9% parts by weight of phosphinate.

29. The composition as claimed in claim 9, wherein the amount of the synthetic resin is from 1 to 5% by weight, based in the phosphinic salt.

30. The composition as claimed in claim 1, wherein the amount added of the wax is from 1 to 5%, by weight, based on the phosphinic salt.

31. The composition as claimed in claim 1, wherein a water-emulsifiable organic liquid acting as a phlegmatizer is added in an around of from 0.1 to 1% by weight, based on the phosphinic salt.

32. The process of claim 28, further comprising the steps of adding an aqueous emulsion of an organic liquid, stirring for from 0.6 to 3 hours at a temperature of from 20 to 90° C.

33. The process of claim 28 further comprising the step of adding from 0.1 to 5% by weight of phlegmatizer.

* * * * *